March 1, 1955 G. K. TEAL 2,703,296

METHOD OF PRODUCING A SEMICONDUCTOR ELEMENT

Filed June 20, 1950

INVENTOR
G. K. TEAL
BY
D. MacKenzie
AGENT

United States Patent Office 2,703,296

Patented Mar. 1, 1955

2,703,296

METHOD OF PRODUCING A SEMICONDUCTOR ELEMENT

Gordon K. Teal, Summit, N. J., assignor to Bell Telephone Laboratories, Incorporated, New York, N. Y., a corporation of New York Application June 20, 1950, Serial No. 169,128

4 Claims. (Cl. 148—1.5)

This invention relates to semiconductor translating devices, and particularly to devices of that character in which rectifying junctions are formed between single crystals of the material, for example silicon or germanium, of opposite electrical conductivity types. An improved method for making such elements, known as p-n junctions, is described as well as a novel form of the same. To provide such is among the objects of the invention.

The use of p-n junctions of semiconductor material is discussed by W. Shockley in the Bell System Technical Journal, volume 28, page 435, 1949, "The Theory of p-n Junctions in Semiconductors and p-n Junction Transistors."

A method of making such junctions is disclosed and claimed in the application of W. Sparks and G. K. Teal, filed June 15, 1950, Serial No. 168,181, now Patent 2,631,356 granted March 17, 1953. In this method, a rod crystal of germanium of one type is drawn from a molten mass of germanium, being lifted from the mass by a seed crystal of germanium of the opposite type; at the interface between the seed crystal and the melt a transverse p-n junction is formed.

The p-n junctions produced by the method above referred to are between p-type and n-type regions of semiconductor in alternation lengthwise of the drawn rod.

The present invention provides cylindrical p-n junctions in which a central core of material of one conductivity type is surrounded by a layer of the same material of the opposite type, which may itself be coated with a layer of the one type, so that the regions of one and of the other type radially alternate.

A general object of the invention is to provide a method and means for producing cylindrical p-n junctions in the form of radially alternating regions of one and the other electrical conductivity type in semiconductor material, which may be germanium or silicon, for example.

Also, an object of the invention is to produce, in the form of a disk of semiconductor material, cylindrical p-n junctions in which a cylindrical layer of the material of one conductivity type is included between concentric regions of the material of opposite conductivity type.

The invention will be understood from the following description thereof, supplemented by detailed reference to the accompanying drawing in which.

In the present invention, a seed crystal of germanium, for example, of one conductivity type is first used to draw from a molten mass of germanium a single crystal of rod form. The melt may be of either p-type or n-type conductivity, as desired.

The method of drawing such a crystal, with controlled transverse enlargement as desired, is disclosed and claimed in application Serial No. 138,354, filed January 13, 1950, by J. B. Little and G. K. Teal, "Production of Single Crystals of Germanium."

The rod is then machined to have at one end a cylindrical shoulder forming a disk of desired radius and thickness, concentric with a stem by which the machined crystal may be seized.

The procedure may be simplified by omitting the machining operation and seizing the seed crystal itself to rotate the drawn crystal. The transverse enlargement of the crystal is capable of serving as does the machined disk in the preparation of a cylindrical p-n junction.

A melt of germanium, of conductivity type opposite that of the machined rod, is prepared and maintained in a hydrogen atmosphere at a temperature somewhat above the melting point. Suitable control mechanism is provided to seize and hold horizontal the stem of the rod and lower it with the terminal disk in a vertical plane until its periphery is partly immersed in the melt. The disk is then rotated about the horizontal axis for one complete revolution, and thereupon lifted a minute distance vertically. Another revolution followed by another lift is made of the disk. In each revolution some of the molten material, lifted by surface tension to embrace the immersed portion of the disk, adheres to the entire perimeter of the disk and is caused to solidify in a thin concentric sheath.

Now lifting the rod through a distance about equal to but not greater than the thickness of the sheath, another rotation is given the rod to acquire from the melt an additional sheath. These operations of alternate rotation and elevation of the disk may be repeated as often as desired, resulting in a disk having a central core of germaniun of one conductivity type surrounded by a germanium sheath of the opposite conductivity type and of desired radial thickness. During each rotation the adherent molten germanium is cooled to solidification by a jet of hydrogen played upon its surface.

There results a cylindrical p-n junction from which a plurality of sections may be cut, each being a p-n junction which may be suitably etched in preparation for service as a rectifier or transistor.

Figure 1:
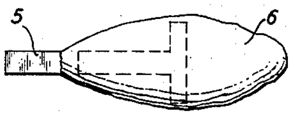
Fig. 1 illustrates a rod single crystal of semiconductor material.

Referring now to Fig. 1, 5 designates a germanium seed crystal which has been used to draw rod single crystal 6 from a melt of germanium by the method disclosed in application Serial No. 138,354, filed January 13, 1950, by J. B. Little and G. K. Teal. Seed 5 may be cut away and rod 6 machined as indicated by the dashed line to provide the disk and stem form shown in Fig. 2.

Figure 2:
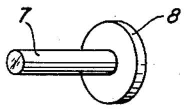
Fig. 2 shows the crystal of Fig. 1 after machining.

In Fig. 2, the machined crystal of Fig. 1 includes cylindrical stem 7 terminated by disk 8, of conveniently greater diameter than stem 7 with which it is concentric. The thickness of disk 8 may be anything desired, leaving stem 7 of sufficient length to be readily manipulated in the apparatus of Fig. 3.

Figure 3:
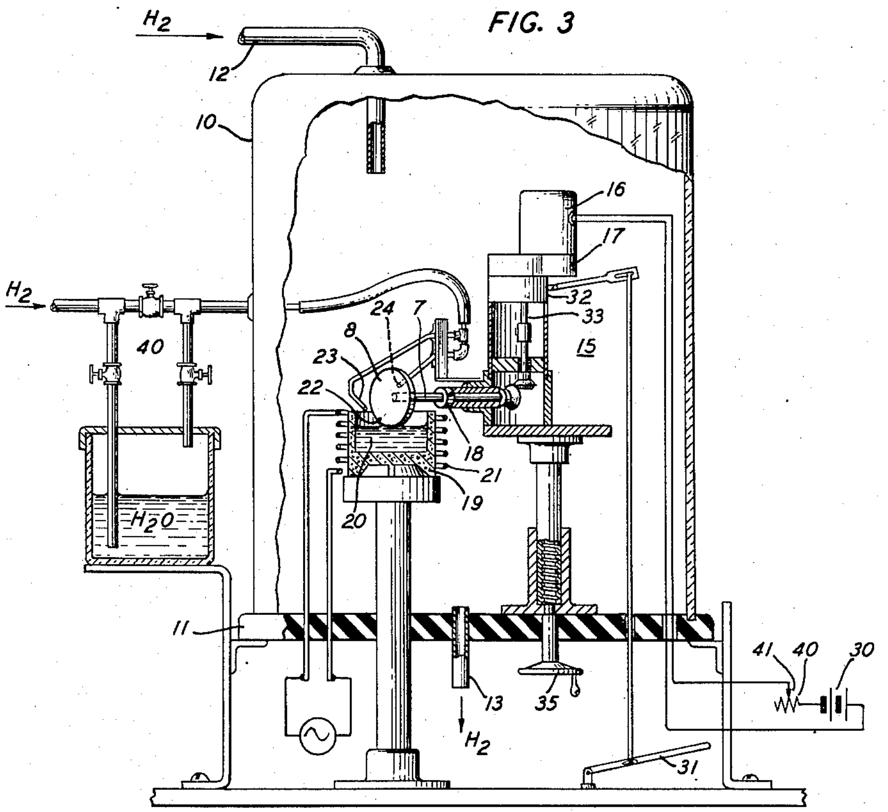
Fig. 3 shows the major elements of the apparatus used.

In Fig. 3, bell jar 10 placed over a supporting stand 11 is provided with entrance and exit passages 12 and 13, respectively, through which a gas may continuously flow into and out of jar 10. Stand 11 supports the apparatus 15 comprising motor 16 and gearing generally indicated at 17; this motor and gearing control the operation of chuck 18 in which is seized stem 7 to be rotated and lifted in alternation. Crucible 19, suitably of graphite, contains a mass 20 of germanium.

After filling crucible 19 with germanium and installing stem 7 in chuck 18 at a convenient level, a jar 10 is flushed of air by a flow of nitrogen. Hydrogen is then caused to flow at the rate of about 100 cubic feet per hour through the bell jar. A high frequency current in coils 21 heats by induction crucible 19, in which solid germanium, of the opposite conductivity type to crystal 6, has previously been loaded. The germanium in crucible 19 is melted to become mass 20 and the current in coils 21 is adjusted to keep the molten material a few degrees above its melting point.

The operation of apparatus 15 is as follows:

Motor 16 is driven at controllable speed from a power source, say battery 30, in series with which is a portion of resistance 40 selected by tap 41. Depressing pedal 31 enables gearing 17 to engage clutch 32 and through it to rotate shaft 33 which through 1:1 bevel gears turns chuck 18 and disk 8. It is to be understood that clutch 32 is provided with a run-out to release shaft 33 after a single revolution unless pedal 31 continues to be depressed.

To immerse the rim of disk 8 in germanium melt 20, hand wheel 35 is rotated to lower apparatus 15. When the immersion is made, pedal 31 is depressed momentarily to permit one rotation of disk 8. Further rotations by repeated depressions of the pedal may be made at the same sitting, but in the normal procedure hand wheel 35 is operated after each rotation to raise apparatus 15 through a distance, say one-thousandth inch, corresponding to the thickness of the germanium sheath solidified about disk 8 in the preceding rotation. Such a sheath is formed in each rotation and the repetition of rotating and lifting disk 8 provides the required thickness.

During all the operations of rotating and lifting disk 8, jets of cooling hydrogen are played upon it from tube 23 toward the disk near its contact with the melt and from tube 24 toward its junction with stem 7. The hydrogen may be drawn through water by suitable manipulation of valves 40.

The operation having been carried on to the described thickness of sheath 22, the entire crystal 6 is removed and disk 8 cut from stem 7. Disk 8 with its sheath 22 is then suitably etched to remove surface defects and appears as shown in Fig. 4A.

Figure 4A:
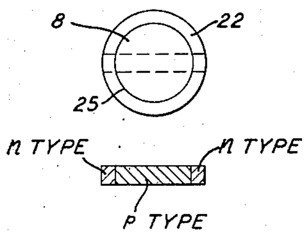
Fig. 4A is a diagrammatic illustration of a cylindrical p-n junction.

Fig. 4A is a view in the plane of sheathed disk 8, and the cylindrical junction of sheath 22 with the core is indicated at 25.

Figure 4B:
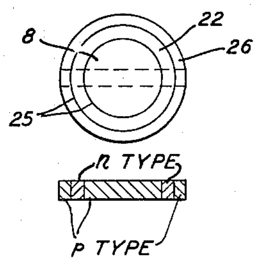
Fig. 4B is a like illustration of a p-n-p junction.

The final etched article may itself be used for peripheral immersion into a bath of germanium of the same conductivity type as core 8 and operated in the apparatus of Fig. 3 to add over its sheath 22 another sheath 26 forming a p-n-p or n-p-n junction depending on the conductivity type of the original crystal 6. Fig. 4B illustrates a core with two concentric sheaths of opposite conductivity types.

In the figures it has been assumed for illustration that crystal 6 is of p-type conductivity and the germanium melt into which it is first partly immersed is of n-type conductivity. Of course the inverse may be desired; in either case, the first treatment provides a p-n junction as in Fig. 4A. In Fig. 4B the junction is either p-n-p as shown, or n-p-n if crystal 6 is p-type or n-type, respectively.

While germanium has been referred to in the foregoing description of the invention, silicon may equally well be used in the same way.

The completed articles may be sectioned transversely of their plane surfaces as indicated by the dotted lines in Figs. 4A and 4B, to provide a plurality of junctions for use as rectifiers, transistors, or other semiconductor translating devices.

What is claimed is:

1. The method of producing a semiconductor element which comprises partly immersing a body of semiconductive material selected from the group consisting of germanium and silicon and of one conductivity type in a molten mass of said material of the opposite conductivity type, rotating said body to pass its peripheral part through said molten mass at a speed to permit solidification of the molten material adherent to the surface of said body as said surface emerges from said mass, cooling the adherent material during the rotating operation, maintaining an inert atmosphere about said body and mass, and removing said body from said mass after the rotating operation.

2. The method of producing a semiconductive body having a cylindrical p-n junction therein which comprises mounting a disc of semiconductive material selected from the group consisting of germanium and silicon and of one conductivity type with its periphery adjacent a molten mass of said material of the opposite conductivity type, maintaining an inert atmosphere about said disc and mass, immersing a peripheral part of said disc in said molten mass, rotating said disc about its axis to pass its entire periphery through said mass at a peripheral speed substantially equal to that permitting solidification of the molten material adherent to the surface of said disc as said surface emerges from said mass, directing a coolant inert with respect to said material at the adherent material during the rotating operation, and removing said disc from said mass after said operation.

3. The method of producing a semiconductor element which comprises mounting a cylinder of semiconductive material selected from the group consisting of germanium and silicon and of one conductivity type, with its axis substantially horizontal and its periphery partly immersed in a molten mass of said material of the opposite conductivity type, maintaining an inert atmosphere about said cylinder and mass, rotating said cylinder about said axis through a complete revolution, directing a coolant inert with respect to said material at the material adherent to the surface of said cylinder outside said molten mass, during the rotating operation, vertically raising the crystal through a distance not greater than the thickness of the solidified adherent material, and repeating in alternation the rotating and raising operations to produce upon said cylinder a layer of prescribed thickness of said material of the opposite conductivity type.

4. The method in accordance with claim 1 which comprises partly immersing said body with the adherent material thereon in a molten mass of said material of said one conductivity type, and repeating the rotating, cooling and removing steps, thereby to produce a semiconductor element having a body portion of said one conductivity type, a layer on said body of said opposite conductivity type and a layer of said one conductivity type on said first layer.

References Cited in the file of this patent

UNITED STATES PATENTS

| | | |
|---|---|---|
| 1,545,427 | Howe et al. | July 7, 1925 |
| 1,879,336 | Foley et al. | Sept. 27, 1932 |
| 2,074,812 | Sendzimer | Mar. 23, 1937 |
| 2,169,816 | Pfeffer | Aug. 15, 1939 |
| 2,195,671 | Ferngren | Apr. 2, 1940 |
| 2,285,695 | DiCesare | June 9, 1942 |
| 2,369,146 | Kingston | Feb. 13, 1945 |
| 2,388,126 | Dettle | Oct. 30, 1945 |
| 2,456,761 | Williams | Dec. 21, 1948 |
| 2,502,488 | Shockley | Apr. 4, 1950 |
| 2,544,837 | Jordan | Mar. 13, 1951 |
| 2,567,970 | Scaff | Sept. 18, 1951 |
| 2,600,500 | Haynes | June 17, 1952 |